Aug. 26, 1941.                E. D. MALOY                 2,254,078
                      DIRECTION INDICATING SIGNAL
                       Filed Dec. 6, 1938        4 Sheets-Sheet 1

INVENTOR.
ERNEST D. MALOY
BY Flournoy Corey
ATTORNEY.

Aug. 26, 1941.    E. D. MALOY    2,254,078
DIRECTION INDICATING SIGNAL
Filed Dec. 6, 1938    4 Sheets—Sheet 2
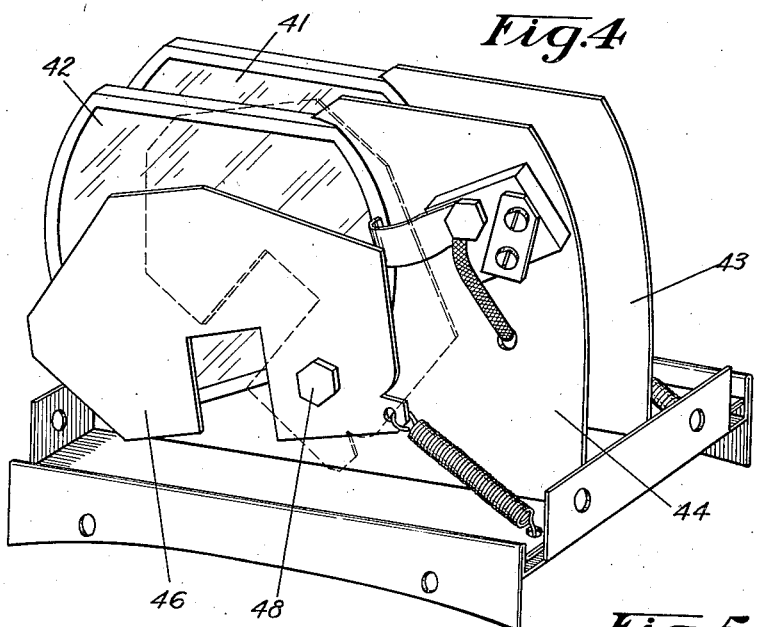
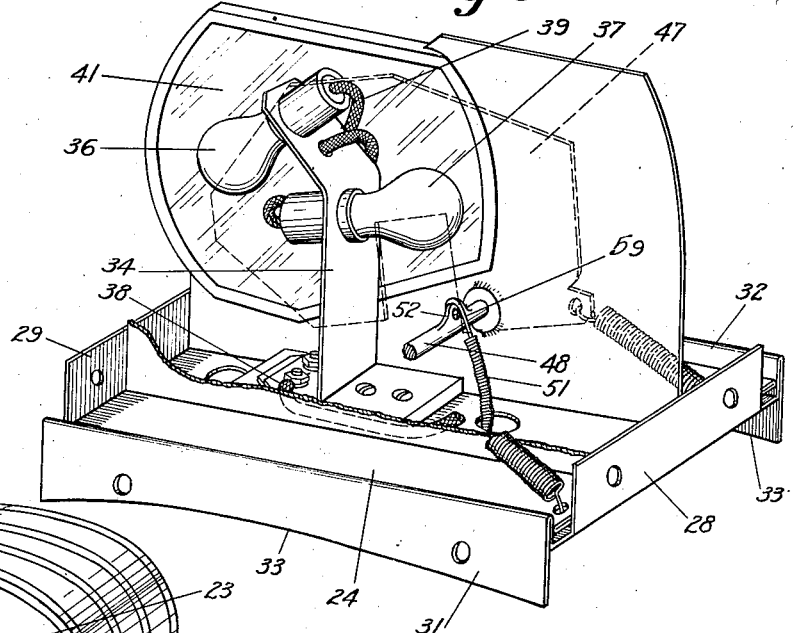
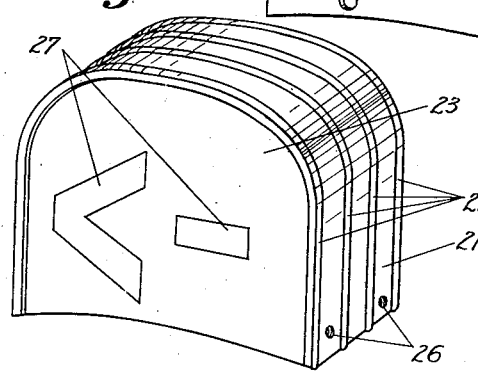
INVENTOR.
ERNEST D. MALOY
BY Flournoy Corey
ATTORNEY.

Aug. 26, 1941.   E. D. MALOY   2,254,078
DIRECTION INDICATING SIGNAL
Filed Dec. 6, 1938   4 Sheets-Sheet 3

INVENTOR.
ERNEST D. MALOY
BY Flournoy Corey
ATTORNEY.

INVENTOR.
ERNEST D. MALOY
BY Flournoy Corey
ATTORNEY.

Patented Aug. 26, 1941

2,254,078

UNITED STATES PATENT OFFICE 2,254,078

DIRECTION INDICATING SIGNAL

Ernest D. Maloy, Cedar Rapids, Iowa

Application December 6, 1938, Serial No. 244,257

6 Claims. (Cl. 116—42)

This invention relates to direction indicating signals and has particular relation to a signal suitable for indicating the direction in which a vehicle is turning or is about to turn.

It is compulsory in many States that trucks be equipped with signals visible to drivers and pedestrians to signal the direction in which a vehicle is turning or is about to turn. While many signal light devices have been proposed in this State and elsewhere, such signals have usually been only conditionally approved. These devices have been only conditionally approved because early in the morning and late in the afternoon the almost level rays of the sun light up the signal lens and it is practically impossible for the usual type of signal to meet the requirements that it be visible for several hundred feet. In fact, even standing within a few feet of the usual signal under these conditions, it is impossible to tell whether they are lighted from the signal bulb or from the sun's rays.

It is, therefore, a general object of my invention to provide a signal which is visible at all hours of the day and night to the full requirements of visibility of such signals.

Still another object of my invention is to provide means for utilizing indirect light, either from a source within the signal, or from outside the signal, or both, for illuminating the signal.

A still further object of my invention is to provide a signal which is positive in operation and which is provided with means for uncovering the signaling device when it is actuated, and covering up the signal when it is not in use.

A still further object of my invention is to provide a signal actuating means which may utilize either electric impulses or mechanical means for actuating the signal.

It is another general object of my invention to provide a direction indicating signal which is relatively simple, inexpensive to construct and maintain, and reliable in operation.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

Figure 3 is a view in perspective of a device constructed according to one embodiment of my invention as it appears ready for use.

Figure 4 is a view in perspective of the device shown in Figures 1 and 3 with the cover removed.

Figure 5 is a view in perspective of the device shown in Figure 4 but with portions thereof broken away to show the structure of the interior of the device.

Figure 1:
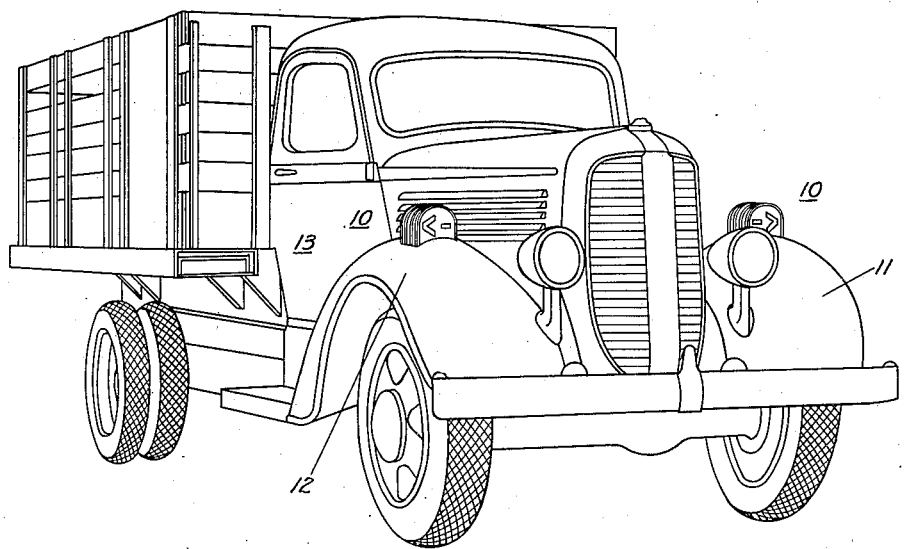
Figure 1 is a view in perspective of a truck illustrating a signal constructed according to one embodiment of my invention as it appears in position on the front fenders of the truck.

Referring now to the drawings:

It is the usual practice, in providing signals such as stop lights, turn indicating signals and the like, to provide a casing and incorporated in this casing a glass cover on which an arrow, the word "Stop", or other indicia is formed in the glass, and to illuminate this glass by means of an electric light bulb whenever it is desired to energize the signal or make it visual. As I have previously pointed out, the difficulty with a signal of this character is that in bright sunlight the reflected light within the signal and at the glass surface may be so great that the signal appears to be illuminated even when the bulb is not energized. Obviously then the signals ordinarily used will not be effective during many of the daylight hours. A turn indicator, however, to be effective must be visible and give a visual indication at any time, day or night.

In overcoming the difficulties above enumerated, I propose to utilize a shutter, either electrically or mechanically actuated, for uncovering the indicia of the signal when the operator of the vehicle wishes to indicate that he is about to make a turn or that the vehicle is coming to a stop, or, in fact, giving any visual signal which is desired during operation of the vehicle.

In practicing my invention, I prefer to utilize a casing such as that illustrated generally at 10 for housing the signaling device, and this housing may be mounted on the front fenders 11 and 12 of a motor vehicle such as the truck 13 or the like. The signals 10 may also be mounted on the back of the truck, either on the fenders if fenders are used, or on the body of the truck.

The signals on the front fenders are preferably double faced so that indication is given both front and rear. In fact some, if not all, of the State laws require an indication in both directions. The rear signals give indications only to the rear of the vehicle. Of course the signal on the left side of the vehicle will be used in indicating a left turn, and the signal on the right side of the vehicle will be used to indicate a right turn.

The casing for one embodiment of my invention is illustrated in Figure 3, and the casing consists of an arched cover member 21 grooved, as indicated at 22, for the sake of appearance and for the reception of the glass covers, such as the one indicated at 23. The cover member 21 is received on a base 24 (Fig. 5) to which it is secured by means of screws 26, and the cover glass 23 is provided with a light transmitting translucent portion 27, which light transmitting portion is in the form of an arrow.

The base 24 is provided with upwardly turned end flanges 28 and 29 to which the cover member 21 is secured, and the sides of the base are provided with downwardly turned flanges 31 and 32 curved or recessed at the lower edges thereof, as indicated at 33, to engage the curved surface of the fenders.

I preferably provide an upstanding base or standard 34 on which lamps 36 and 37 may be mounted. The current for energizing these lamps is brought into the signal through the conductors 38 and 39. In this form of the invention the lamps 36 and 37 are so arranged that lamp 36 illuminates the point of the arrow 27 on the glass cover, while the lamp 37 illuminates the shaft. Light transmitting glasses 41 and 42 (Fig. 4) are provided in the base, being supported thereon by means of separators 43 and 44, and these light transmitting glasses 41 and 42 serve to modify the light from the bulbs 36 and 37 or light shining through the signal to give a yellow or red light as desired. Now the signal lights may be energized at all times or may be energized only when it is desired to illuminate the signal. It is readily apparent that even though light passes entirely through the signal, it will be modified by the glasses or lenses 41 and 42, and that these glasses will be lighted either by the bulbs 36 and 37 at nighttime, or by both the bulbs and daylight passing through the signal during the daylight hours.

Figure 2:
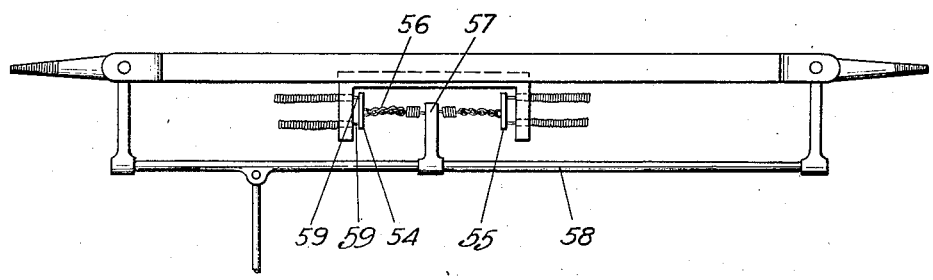
Figure 2 is a diagrammatic view illustrating how the signal may be actuated by mechanical means.

In utilizing this light I provide one or more shutters, such as indicated at 46 and 47, positioning these shutters preferably between the glasses or lenses 41 and 42 and the glass cover plate members 23. These shutters are so shaped that in the normal position thereof, such as illustrated in Figure 4, the shutters cover up the indicia on the covers 23. The shutters 46 and 47 are mounted on a through shaft 48 and may be rotated to a raised position, such as indicated in dotted lines in Figure 4, by means of a control wire 59 which passes through a coiled wire cover or sheath 51, or by any other mechanical means, or by an electrical means such as a solenoid. The means such as the wire 49, if used, is engaged to a short lever arm 52 on the shaft 48 and thus rotates the shaft when it is pulled. The wire may be pulled manually, as by means of any suitable pull knob, mounted for instance, on the dash, or may be pulled by means of the device illustrated in Figure 2 in which a yoke member 54 is secured by means of a chain 56 to a clamp or strap-like member 57 on the tie rod 58 of the motor vehicle. The yoke 54 is secured to the ends of wires 59 which go to the shutters of the signals on the left hand side of the vehicle. In the same manner the yoke 55 is employed to indicate right turns. It is apparent that turning the wheel to make a left turn will cause the tie rod 58 to move to the right and thus pull the control wires 59. The wires, of course, connect with and control the shutters of signals on the front and rear of the left side of the vehicle. The control wire sheaths are, of course, supported on the vehicle frame and at other points as required.

It should be readily understood that in the signal just described, illumination of the indicia of the signal is controlled by the shutter. Whether this illumination originates from the bulbs within the signal or from light passing through the signal from other sources is immaterial. The shutters 46 and 47 are preferably painted black and the covers 23 are black except at the indicia 27.

Figure 6:
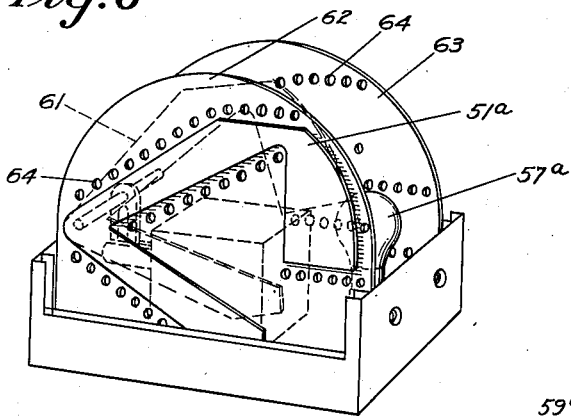
Figure 6 is a view in perspective of a device constructed according to another embodiment of my invention. A portion of the device has been removed to show the interior thereof.
Figure 7:
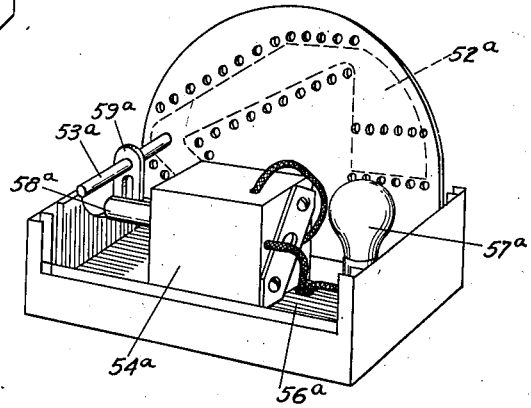
Figure 7 is a view in perspective of the device shown in Figure 6 but with still other portions removed to further illustrate the interior of the device.
Figure 8:
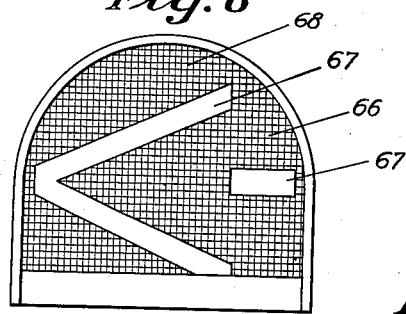
Figure 8 is a view in elevation of one of the reflecting glass covers of the device shown in Figure 6.

In another embodiment of the invention, as illustrated in Figures 6 to 9 inclusive, I employ one or more shutters such as indicated at 51a and 52a, mounting these shutters on a through shaft 53a as previously described. I may also employ a solenoid, such as that illustrated at 54a, which is secured to the base plate 56 of the signal. A lamp 57a is employed and this is likewise mounted on the base 56a. The core 58a of the solenoid is pivotally engaged to lever arm 59a which rotates the shaft 53a to raise the shutter to the dotted line position 61, as illustrated in Figure 6.

In this embodiment of the invention the separators 62 and 63 are opaque except for a plurality of openings such as illustrated at 64. These openings let the light from the bulb 57a shine through the separators, and the light shining through these separators 62 and 63 is reflected from the glass covers or reflecting covers 66 (Fig. 8) back onto the outer reflecting surfaces of the separators 62 and 63. These outer surfaces are painted bright yellow, or red, or any other desired color, and the shutters 51a and 52a are preferably painted black. The covers, such as illustrated at 66, are opaque except at the indicia 67 which are translucent. The covers may be painted at the portions 68 or any other means employed to prevent the passage of light or to modify light shining through the covers. The illumination from the lamp 57a on the painted reflecting surfaces of the separators 62 and 63 is sufficiently bright that this surface is visible for several hundred feet behind or in front of the vehicle.

The covers 66 are preferably painted black except for the indicia and the outer surfaces of the shutters 51a and 52a are preferably black, so that when the signal is in the inoperative condition (that is, the normal condition), the black surface of the shutters is behind the indicia 67 to make the whole signal seem as one black surface. When the solenoid 54a is energized, the shutters 51a and 52a are raised to expose the reflecting surfaces of the separators 62 and 63 to thus show a contrasting color such as yellow at the indicia 67. This contrasting yellow is always visible day or night and may be seen from a distance of several hundred feet.

Figure 9:
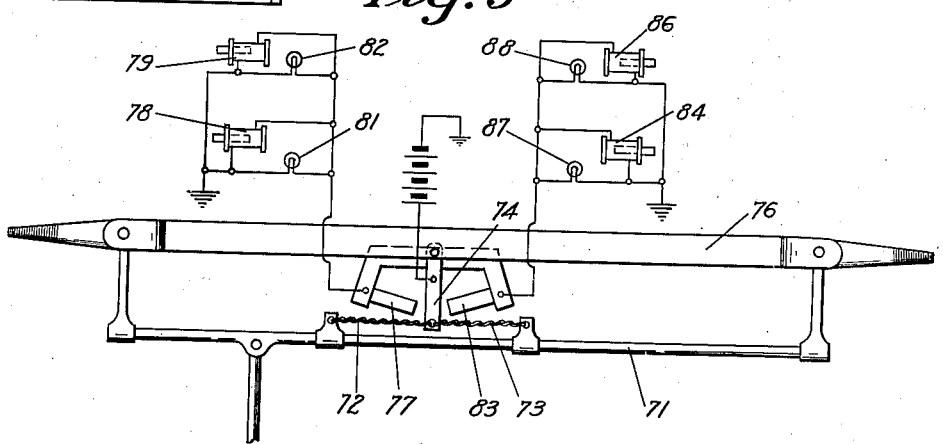
Figure 9 is a schematic diagram illustrating means for actuating the signal shown in Figures 6, 7 and 8.

In Figure 9 I have illustrated an electrical system for controlling the energization of the signals in accordance with the movement of the tie rod 71 of a motor vehicle. The tie rod 71 is connected by means of chains 72 and 73 to the blade 74 of a double-throw single-pole knife switch. The blade 74 is provided with an electrical connection to the storage battery of the motor vehicle and when it is pulled to the left, as in making a right turn, the blade, which is pivotally mounted on the axle 76, is caused to engage the contact 77 to close a circuit leading through the solenoids 78 and 79 and the lamps 81 and 82. These solenoids and lamps are located in the signals on the right hand side of the vehicle to indicate a right turn.

In the same manner, when the tie rod moves to the right in making a left turn, the switch blade 74 engages the contact 83 to energize the solenoids 84 and 86 and the lamps 87 and 88 on the left side of the vehicle. Of course ordinary push-pull switches, or any suitable switches, may be employed for this purpose.

Figure 10:
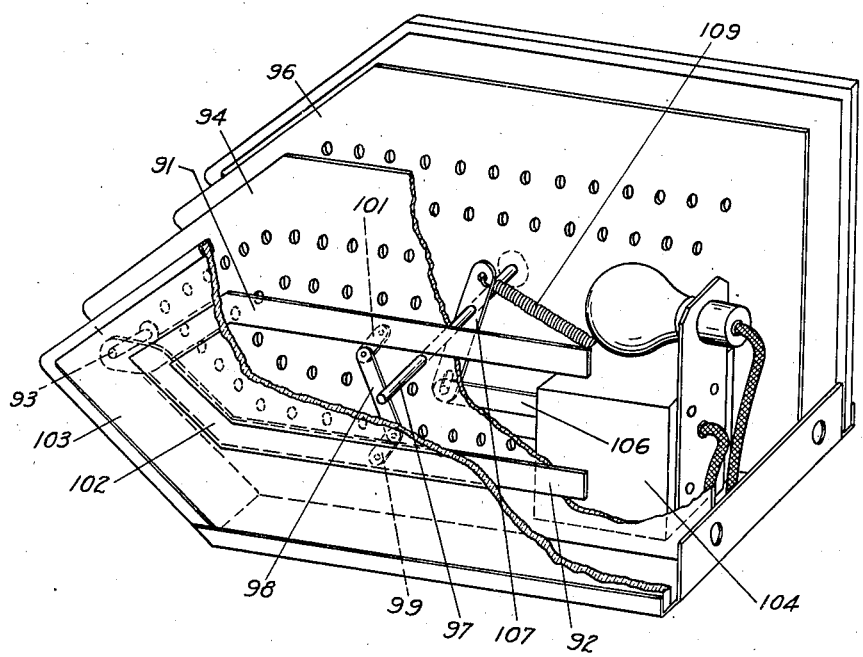
Figure 10 is a view in perspective broken away to illustrate the construction of another embodiment of my invention.

Another embodiment of my invention, as illustrated in Figure 10, may be incorporated in a device visible from one direction only. It is preferable, however, that it be constructed as shown so as to be visible from both the front and rear. In such case duplicate indicia, targets and shutter arms must be used. For simplicity the structure, as illustrated in Figure 10, has been broken away to show only one set of shutter arms. Another pair of arms must of course be employed in connection with the target 96 and its indicia. I employ the same principle of actuating the shutters of the signal, but in this case the shutters consist of two arms 91 and 92 pivotally joined at the intersecting points thereof, as indicated at 93.

The pivotal means 93 is preferably supported from the separator or target plate 94.

A horizontally extending shaft 97 is supported for rotation by the separators or target members 94 and 96. This shaft 97 is arranged to extend midway between the shutter arms 91 and 92 and has a lever arm 98 attached at its midpoint to the end of the shaft. Link members 99 and 101 are pivotally connected to the ends of the lever arm 98 and to the shutter arms 91 and 92, preferably near their midpoints. It is apparent that turning the shaft 97 causes the lever arm 98 to move the links 99 and 101 and thereby cause the shutter arms 91 and 92 to move inwardly about the pivot point 93. The movement of the shutter arms is arranged to uncover translucent indicia 102 on the cover plate 103. This in turn permits the illuminated target 94 to be visible through the translucent portion of the cover in the same manner as in the device illustrated in Figures 6, 7 and 8 and described heretofore.

The shaft 97 may be caused to rotate by means of a solenoid 104, the plunger 106 thereof being pivotally attached to a lever arm 107 which is fixedly attached to the shaft 97. The end of this lever arm 107 is preferably extended beyond the point of attachment to the shaft 97 and is drawn by means of a spring 109 toward the solenoid so as to hold the shutter plates in the closed position at all times when the solenoid is not energized.

Figure 11:
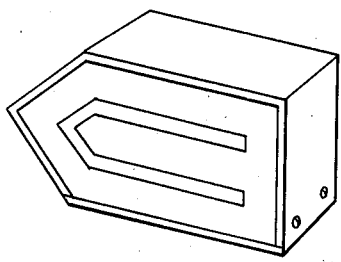
Figure 11 is a view in perspective showing the external appearance of the device shown in Figure 10.

The completed device is shown in Figure 11.

It is apparent that I have provided a signal means which is visible day or night. Furthermore this signal has been approved by the State Highway Department of this State as being entirely acceptable, whereas other signals have been only conditionally accepted.

Although I have described several embodiments of my invention, it is apparent that modifications thereof may be made by those skilled in the art. Such modifications may be made without departing from the spirit and scope of my invention as set forth in the appended claims.

I claim as my invention:

1. In a signal, a reflecting target within the signal, a cover member having translucent indicia thereon through which the target may be viewed, a shutter between the cover and the target for interrupting the view of the target, and means for moving the shutter to permit viewing the target for giving an indication.

2. In a signaling device, an enclosure, translucent indicia on at least one vertical side thereof, a shutter to cover the indicia, a reflecting target behind the shutter, a means for illuminating the target, and a means for moving the shutter to uncover the indicia.

3. In a signaling device, an enclosure, translucent indicia on at least one side thereof, a shutter to cover the indicia, a target behind the shutter comprising a plate finished to reflect rays of light through the indicia, a means behind the target for illuminating the target, said target being perforated outside of a reflecting area substantially the same shape as the indicia and adjacent thereto to permit light rays to pass therethrough to be reflected by the inner surface of the enclosure back onto the reflecting area of the target, and a means for moving the shutter to uncover the indicia.

4. In a signaling device, an enclosure, translucent indicia on at least one side thereof, a shutter to cover the indicia, a means for moving the shutter to uncover the indicia, a translucent target behind the shutter, a means for illuminating the target, and means for permitting illumination outside the enclosure to pass through the enclosure, through the target and through the indicia.

5. In a vehicle having front wheels and means including a tie rod for directing the wheels, a mechanically operated signaling device, including a strap-like clamp member attached to the tie rod of the vehicle, yoke members, means connecting the strap member to the yoke members, wire control members each connected at one end with one end of a yoke member, and signaling devices operatively connected to the other ends of the control members.

6. In a signalling device, an enclosure, translucent indicia on side walls of same, a source of illumination within the enclosure, a shutter means including arms pivotally mounted at one end to cover the indicia, means to move the arms to uncover the indicia including a shaft, a toggle on the shaft, links connecting the ends of the toggle and the shutter arms, and means for rotating the shaft.

ERNEST D. MALOY.